(12) United States Patent
Yamanaka

(10) Patent No.: US 10,496,408 B2
(45) Date of Patent: Dec. 3, 2019

(54) INFORMATION PROCESSING APPARATUS AND CONVERSION METHOD

(71) Applicant: FUJITSU LIMITED, Kawasaki-shi, Kanagawa (JP)

(72) Inventor: Masanori Yamanaka, Chigasaki (JP)

(73) Assignee: FUJITSU LIMITED, Kawasaki (JP)

( * ) Notice: Subject to any disclaimer, the term of this patent is extended or adjusted under 35 U.S.C. 154(b) by 352 days.

(21) Appl. No.: 15/470,975

(22) Filed: Mar. 28, 2017

(65) Prior Publication Data

US 2017/0337060 A1    Nov. 23, 2017

(30) Foreign Application Priority Data

May 23, 2016 (JP) .................................. 2016-102291

(51) Int. Cl.
*G06F 9/44* (2018.01)
*G06F 9/30* (2018.01)
*G06F 9/38* (2018.01)

(52) U.S. Cl.
CPC ...... *G06F 9/30181* (2013.01); *G06F 9/30018* (2013.01); *G06F 9/30021* (2013.01); *G06F 9/30029* (2013.01); *G06F 9/30072* (2013.01); *G06F 9/3887* (2013.01)

(58) Field of Classification Search
CPC ............. G06F 9/30181; G06F 9/30018; G06F 9/30029; G06F 9/30072; G06F 9/3887; G06F 9/30021
See application file for complete search history.

(56) References Cited

U.S. PATENT DOCUMENTS

| | | | | |
|---|---|---|---|---|
| 5,802,375 A | * | 9/1998 | Ngo ........................ | G06F 8/452 717/150 |
| 6,119,198 A | * | 9/2000 | Fromm ................ | G06F 15/8007 711/219 |
| 6,128,639 A | * | 10/2000 | Pase ........................ | G06F 7/535 708/502 |
| 2009/0307472 A1 | * | 12/2009 | Essick, IV .......... | G06F 9/30072 712/241 |

(Continued)

FOREIGN PATENT DOCUMENTS

| | | |
|---|---|---|
| JP | 11-203273 | 7/1999 |
| JP | 11-242598 | 9/1999 |

*Primary Examiner* — Lewis A Bullock, Jr.
*Assistant Examiner* — Tina Huynh
(74) *Attorney, Agent, or Firm* — Fujitsu Patent Center

(57) ABSTRACT

An information processing apparatus sets, in a second program: a second array where an occurrence pattern indicating whether elements are subjected to computation is a repetition of a pattern for every power-of-two number of elements; a second mask array generated by adding masks indicating that corresponding elements are not subjected to the computation to a first mask array so that the second mask array includes as many masks as the number of elements included in a second pattern; and a second instruction string providing an instruction for the computation of elements corresponding to masks indicating that corresponding elements are subjected to the computation, among the elements set in the second array. Each mask in the second mask array to be applied to an element in the second array is specified by a bitwise logical AND using a value indicating the position of the element in the second array.

7 Claims, 20 Drawing Sheets

(56) References Cited

U.S. PATENT DOCUMENTS

| | | | |
|---|---|---|---|
| 2010/0169612 A1* | 7/2010 | Persson | G06F 9/325 |
| | | | 712/205 |
| 2013/0185540 A1* | 7/2013 | Hung | G06F 15/76 |
| | | | 712/7 |
| 2014/0189321 A1* | 7/2014 | Uliel | G06F 9/30018 |
| | | | 712/222 |
| 2016/0103785 A1* | 4/2016 | Sperber | G06F 9/30036 |
| | | | 712/22 |

* cited by examiner

```
                    51   STENCIL COMPUTATION PROGRAM real a(30,20),b(30,20)
do j=2,19
   do i=2,29
      a(i,j)=(b(i-1,j-1)+b(i+1,j-1)+b(i-1,j+1)+b(i+1,j+1))/4
   enddo
enddo
```

FIG. 5

52   STENCIL COMPUTATION PROGRAM

```
real a(30,20),b(30,20)
logical mask(30,20)
mask=.false. ! Initialize all to false
do j=2,19
   do i=2,29
      ! Set masks to true for portions to be subjected to computation
      mask(i,j)=.true.
   enddo
enddo
do ij=1,30*20
   if(mask(ij,1))then
      ! Perform computation if mask is true
      a(ij,1)=(b(ij-1-30,1)+b(ij+1-30,1)+b(ij-1+30,1)+b(ij+1+30,1))/4
   endif
enddo
```

FIG. 7

*— 53* STENCIL COMPUTATION PROGRAM

```
real a(30,20),b(30,20)
logical mask(30,20)
mask=.false. ! Initialize all to false
do j=2,19
   do i=2,29
      ! Set masks to true for portions to be subjected to computation
      mask(i,j)=.true.
   enddo
enddo
do ij=1+30,30*20-30
   if(mask(ij,1))then
      ! Perform computation if mask is true
      a(ij,1)=(b(ij-1-30,1)+b(ij+1-30,1)+b(ij-1+30,1)+b(ij+1+30,1))/4
   endif
enddo
```

FIG. 9

54 STENCIL COMPUTATION PROGRAM

```
real a(30,20),b(30,20)
logical mask(30)
mask=.true. ! Initialize all to true
mask(1)=.false. ! Set both ends of mask pattern to false
mask(30)=.false. ! Set both ends of mask pattern to false
! Body of computation
do ij=1+30,30*20-30
   if(mask( mod(ij-1, 30) + 1 ))then
      ! Perform computation if mask is true
      a(ij,1)=(b(ij-1-30,1)+b(ij+1-30,1)+b(ij-1+30,1)+b(ij+1+30,1))/4
   endif
enddo
```

FIG. 11

*— 55 STENCIL COMPUTATION PROGRAM*

```
real aa(32,20),bb(32,20)
logical mask(32)
mask=.true. ! Initialize all to true
mask(1)=.false. ! Set false for both ends of mask pattern
mask(30)=.false. ! Set false for both ends of mask pattern
mask(31)=.false. ! Set false for expanded portion of mask pattern
mask(32)=.false. ! Set false for expanded portion of mask pattern
! Body of computation
do ij=1+32,32*20-32
   if(mask( iand( ij-1, 31)+1 ))then
   ! Perform computation if mask is true
       aa(ij,1)=(bb(ij-1-32,1)+bb(ij+1-32,1)+bb(ij-1+32,1)+bb(ij+1+32,1))/4
   endif
enddo
```

FIG. 14

73 SOURCE PROGRAM

```
real a(M,N),b(M,N)
logical mask(M,N)
mask=.false. ! Initialize all to false
do j=2,N-1
  do i=2,M-1
    ! Set masks to true for portion to be subjected to computation
    mask(i,j)=.true.
  enddo
enddo
do ij=1,M *N
  if(mask(ij,1))then
    ! Perform computation if mask is true
    a(ij,1)=...
  endif
enddo
```

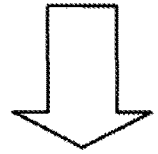

71 MASK-APPLIED LOOP PROCESSING PROGRAM

```
real:array:a(M,N),b(M,N)
logical:mask(M,N)

mask=flase
loop:j:start value=2:end value=N-1
  loop:i:start value=2:end value=M-1
    mask(i,j)=true
loop:ij:start value=1+M:end value=M*N-M
  if:mask(ij,1)==true:a(ij,1)=(b(ij-1-M,1)+b(ij+1-M,1)+b(ij-1+M,1)+b(ij+1+M,1))/4
```

FIG. 16

71 MASK-APPLIED LOOP PROCESSING PROGRAM

```
real:array:a(M,N),b(M,N)
logical:mask(M,N)

mask=false
loop:j:start value=2:end value=N-1
  loop:i:start value=2:end value=M-1
    mask(i,j)=true
loop:ij:start value=1+M:end value=M*N-M
  if:mask(ij,1)==true:a(ij,1)=(b(ij-1-M,1)+b(ij+1-M,1)+b(ij-1+M,1)+b(ij+1+M,1))/4
```

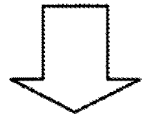

72 EXPANDED MASK-APPLIED LOOP PROCESSING PROGRAM

```
real:array:a(X,N),b(X,N)
logical:mask(X)

mask=false
loop:i:start value=2:end value=M-1
  mask(i)=true
loop:ij:start value=1+X:end value=X*N-X
  if:mask(iand(ij-1,X-1)+1)==true:a(ij,1)=(b(ij-1-X,1)+b(ij+1-X,1)+b(ij-1+X,1)+b(ij+1+X,1))/4
```

FIG. 19

73 SOURCE PROGRAM

```
real a(M,N),b(M,N)
logical mask(M,N)
mask=.false. ! Initialize all to false
do j=2,N-1
  do i=2,M-1
    ! Set masks to true for portion to be subjected to computation
    mask(i,j)=.true.
  enddo
enddo
do ij=1,M *N
  if(mask(ij,1))then
    ! Perform computation if mask is true
    a(ij,1)=···
  endif
enddo
```

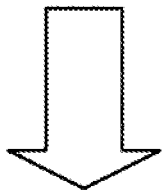

74 SOURCE PROGRAM

```
real a(X,N),b(X,N)
logical mask(X)
mask=.false. ! Initialize all to false
do i=2, M-1
  ! Set masks to true for portion to be subjected to computation
  mask(i)=.true.
enddo
do ij=1+X, X *N-X
  if(mask(iand(ij-1, X-1)+1))then
    ! Perform computation if mask is true
    a(ij,1)=···
    endif
enddo
```

FIG. 20

INFORMATION PROCESSING APPARATUS AND CONVERSION METHOD

CROSS-REFERENCE TO RELATED APPLICATION

This application is based upon and claims the benefit of priority of the prior Japanese Patent Application No. 2016-102291, filed on May 23, 2016, the entire contents of which are incorporated herein by reference.

FIELD

The embodiments discussed herein relate to an information processing apparatus and a conversion method.

BACKGROUND

In the fields of High Performance Computing (HPC), high parallelization is desired to make full use of hardware performance as the number of computing nodes and the number of Central Processing Unit (CPU) cores increase. Especially, in a multithreaded environment in a shared memory system, it is possible to make full use of hardware performance by creating as many threads as the number of CPU cores and binding the threads to the CPU cores in a one-to-one fashion.

In general, in parallelizing a nested loop in a shared memory system, the parallelization of the outermost loop achieves a reduction in parallelization cost and is therefore efficient. However, if the number of iterations of the outermost loop is less than the number of CPU cores, it is not possible to make full use of the hardware performance because the parallelization of the outermost loop does not result in using all the CPU cores. To deal with this, a technique of converting the nested loop into a single loop, expanding the iteration space of the loop, and then performing parallelization is employed.

There may be cases where access to a multidimensional array within a nested loop is contiguous in the memory. In such cases, a computation expression using a loop control variable after conversion to a single loop is created to obtain subscripts of the multidimensional array so that the multidimensional array is accessed as if it were like a one-dimensional array. This approach makes it possible to perform Single Instruction Multiple Data vectorization (SIMDization) of the processing. The subscripts of the multidimensional array are numerical values each indicating the position of an element in the multidimensional array. Hereinafter, the computation expression for computing the subscripts is referred to as a subscript expression. The SIMDization is to generate an instruction (SIMD instruction) to achieve parallel processing by executing a single instruction on a plurality of data items at the same time. The SIMDization to generate SIMD instructions at the time of compiling a program improves the processing efficiency.

Even if access to the multidimensional array is not contiguous in the memory, it is possible to perform the SIMDization such as to generate an SIMD instruction with masks. The SIMD instruction with masks uses masks to separate portions to be subjected to computation from portions not to be subjected to the computation. The values (true or false) of the masks for respective elements to be accessed are represented as a mask array.

For example, as a technique of converting a nested loop into a single loop, there has been considered a compiling method that achieves an acceleration of vector operation processing with mask data, which is involved in conversion of a nested loop into a single loop and loop combining at the compiling time. In addition, for the case where a loop for computation defines arrays in different dimensions or of different sizes, there has been considered a technique that achieves an accelerated computation of the arrays by reducing the number of loops.

Please see, for example, Japanese Laid-open Patent Publication Nos. 11-242598 and 11-203273.

Consider the case of using an SIMD instruction with masks. If masks are prepared for respective ones of all elements to be accessed, the data amount of the masks increases with an increase in the amount of data to be accessed. If the data amount of masks is excess, large memory capacity is consumed to store the masks, which causes a decrease in the processing efficiency of the system.

To deal with this, there is an attempt to reduce the data amount of masks. For example, in the case where elements to be subjected to computation and elements not to be subjected to the computation appear in a fixed repetitive pattern, a mask pattern of small size corresponding to a single repetition of the pattern is prepared and its masks are used repeatedly. If it is possible to repeatedly use the mask pattern of small size, the data amount of masks is reduced. However, in order to use the mask pattern of small size repeatedly, a complicated expression may be needed to specify masks. However, a complicated expression is not usable to specify masks in an SIMD instruction with masks.

As described above, in the case where access to a multidimensional array is not contiguous in a memory, a complicated subscript expression for the mask array needs to be used to reduce the data amount of masks at the time of SIMDization, which ends up being unable to use SIMD instructions with masks.

SUMMARY

According to one aspect, there is provided an information processing apparatus including: a memory configured to store a first program including a first instruction string, the first instruction string providing an instruction for computation of elements to be subjected to the computation among a plurality of elements set in a first array using a first mask array, the first mask array specifying a plurality of masks indicating whether corresponding ones of the plurality of elements are subjected to the computation or not; and a processor configured to perform a process including when an occurrence pattern indicating whether each of the plurality of elements is subjected to the computation or not, indicated by the first mask array, is a repetition of a first pattern for every determined number of elements, setting a second array in a second program, the second array being generated by adding one or more elements to the first array so that the occurrence pattern becomes a repetition of a second pattern for every power-of-two number of elements greater than or equal to the determined number of elements, setting a second mask array in the second program, the second mask array being generated by adding, to the first mask array, one or more masks each indicating that a corresponding element is not subjected to the computation so that the second mask array includes as many masks as a number of elements included in the second pattern, and setting a second instruction string in the second program, the second instruction string providing instructions for specifying, in the second mask array, each mask to be applied to one of a plurality of elements set in the second array by using a bitwise logical AND using a value indicating a position of the one of the plurality of elements in the second array and for the computation of elements corresponding to masks indicating that corresponding elements are subjected to the computation among the plurality of elements set in the second array.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a stencil computation program;

FIG. 7 illustrates an example of a stencil computation program including a mask generation process;

FIG. 9 illustrates an example of a stencil computation program with a limited iteration range of a loop;

FIG. 11 illustrates an example of a stencil computation program using a mask pattern that is repeatedly used;

FIG. 14 illustrates an example of a stencil computation program using the expanded mask pattern;

FIG. 16 illustrates an example of generating a mask-applied loop processing program;

FIG. 19 illustrates an example of the expansion process; and

FIG. 20 illustrates an example of modifying a source program.

DESCRIPTION OF EMBODIMENTS

Figure 1:
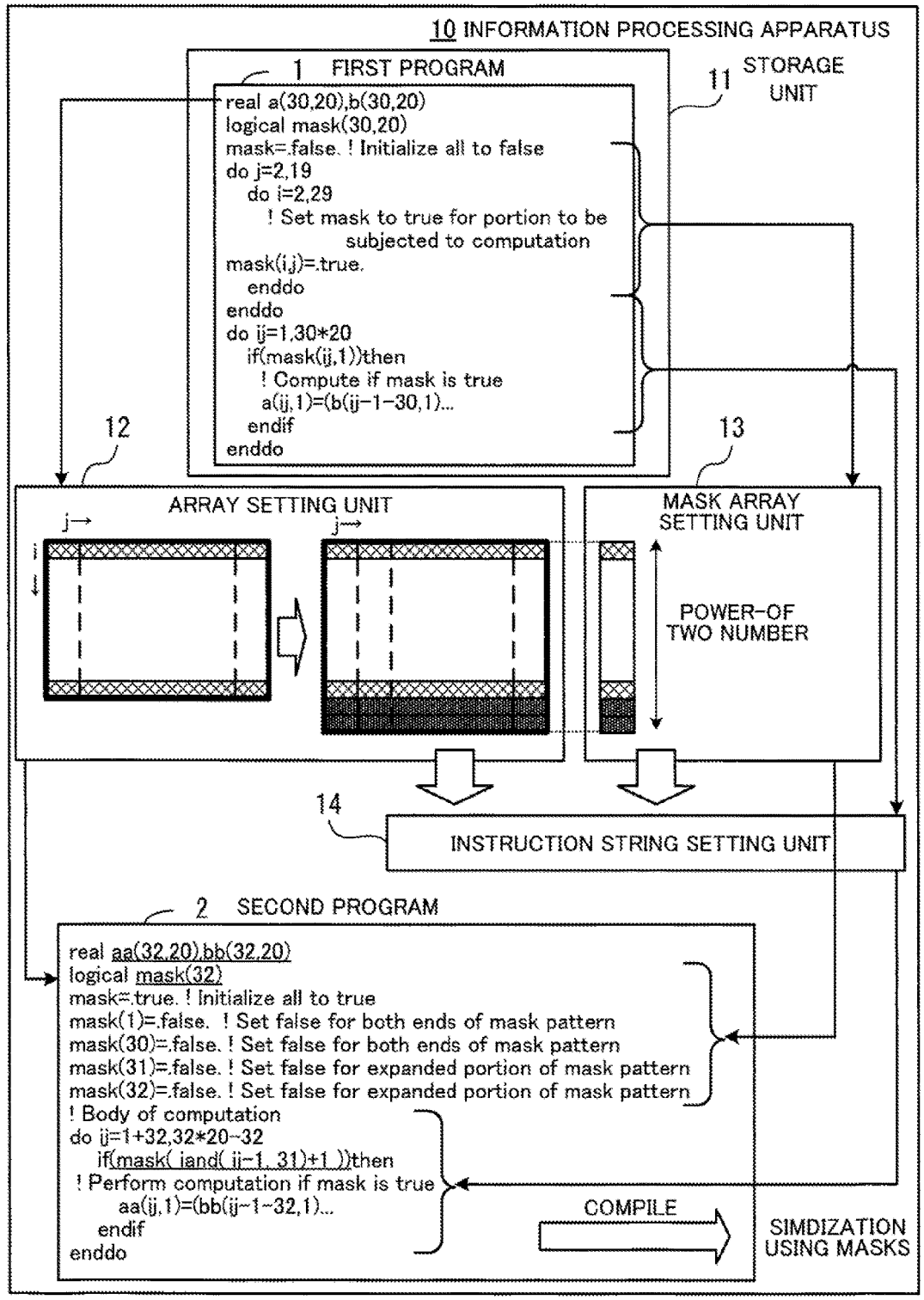
FIG. 1 illustrates an example of a functional configuration of an information processing apparatus according to a first embodiment.

Several embodiments will be described below with reference to the accompanying drawings, wherein like reference numerals refer to like elements throughout. It is noted that one or more of the embodiments may be combined as long as the combined embodiments are not mutually exclusive.

First Embodiment

FIG. 1 illustrates an example of a functional configuration of an information processing apparatus according to a first embodiment. An information processing apparatus 10 includes a storage unit 11, an array setting unit 12, a mask array setting unit 13, and an instruction string setting unit 14.

The storage unit 11 stores therein a first program 1 including a first instruction string. This first instruction string provides an instruction for computation of elements to be subjected to the computation among a plurality of elements set in a first array, using a first mask array that specifies a plurality of masks respectively indicating whether the corresponding elements in the first array are subjected to the computation or not. For example, the first program 1 is obtained by converting a nested loop to a single loop in a program including the nested loop. Using such a program in which a nested loop has been converted to a single loop makes it possible to perform parallel processing using many processing cores.

In the case where an occurrence pattern indicating whether corresponding elements are subjected to the computation or not, indicated by the first mask array, is a repetition of a first pattern for every determined number of elements, the array setting unit 12 sets a second array generated by expanding the first array defined in the first program 1, in a second program 2. The second array is generated by adding elements to the first array so that the occurrence pattern indicating whether elements are subjected to the computation or not is a repetition of a second pattern for every power-of-two number of elements greater than or equal to the determined number of elements. For example, in the case where the first array is a multidimensional array having a prescribed number of elements in one dimension, the array setting unit 12 increases the number of elements in the one dimension of the first array to the number of elements included in the second pattern, and sets the generated multidimensional array with the number of elements increased, as the second array. In this connection, for example, the number of elements in the second pattern is the smallest value among powers of two greater than or equal to the number of elements included in the first pattern.

The mask array setting unit 13 sets, in the second program 2, a second mask array that is generated by adding masks each indicating that a corresponding element is not subjected to the computation to the first mask array so that the second mask array includes as many masks as the number of elements included in the second pattern.

The instruction string setting unit 14 sets, in the second program 2, a second instruction string that provides an instruction for computation of elements corresponding to masks indicating that corresponding elements are subjected to the computation among a plurality of elements set in the second array. In the second mask array, each mask that is applied to an element in the second array is specified by a bitwise logical AND using a numerical value indicating the position of the element in the second array. For example, the instruction string setting unit 14 takes, as a subscript of the second mask array, a value calculated by performing the bitwise logical AND using a value obtained by subtracting one from a numerical value indicating the position of an element to be subjected to the computation and a value obtained by subtracting one from the number of elements included in the second pattern, and adding one to the result of the bitwise logical AND, in order to thereby specify a mask to be applied to the element. In this connection, the computation of elements that is performed in the second program 2 is the same as that is performed in the first program 1.

In the above information processing apparatus 10, masks to be applied to elements are specified with the bitwise logical AND as a subscript expression for a mask array. The bitwise logical AND is usable as a subscript expression to specify masks, in an SIMD instruction with masks. In addition, the second mask array set in the second program 2 needs a small number of masks, compared with the case of preparing a mask for every element in the first array. That is, the information processing apparatus 10 is able to reduce the number of masks used in an SIMD instruction with masks.

In this connection, the information processing apparatus 10 may be provided with a judgment unit (not illustrated) for determining whether to generate the second program 2 or not. The judgment unit compares a first differential value indicating a difference between the data amount of the first mask array and the data amount of the second mask array with a second differential value indicating a difference between the data amount of the first array and the data amount of the second array. The judgment unit then determines based on the comparison result whether to generate the second program 2. For example, the judgment unit determines to generate the second program 2 when the first differential value is greater than the second differential value. This leads to a reduction in the data amount of masks. That is to say, it is possible to generate a second program only when the amount of data used as a whole is definitely reduced.

In this connection, the array setting unit 12, mask array setting unit 13, and instruction string setting unit 14 illustrated in FIG. 1, and the judgment unit (not illustrated) are implemented by using a processor provided in the information processing apparatus 10, for example. In addition, the storage unit may be implemented by using a memory or a storage device provided in the information processing apparatus 10.

In addition, lines connecting the units illustrated in FIG. 1 represent some of communication paths, and other communication paths than illustrated may be configured.

Second Embodiment

A second embodiment will now be described. In developing a program to be executed in parallel on an HPC system, the second embodiment is designed to generate an efficient program using an SIMD instruction effectively by simplifying a subscript expression for a mask array to a bitwise logical AND. In addition, the second embodiment is designed to generate the program using the SIMD instruction only when the processing efficiency is definitely improved by using the SIMD instruction. This makes it possible to prevent the processing efficiency from decreasing due to the use of the SIMD instruction.

Figure 2:
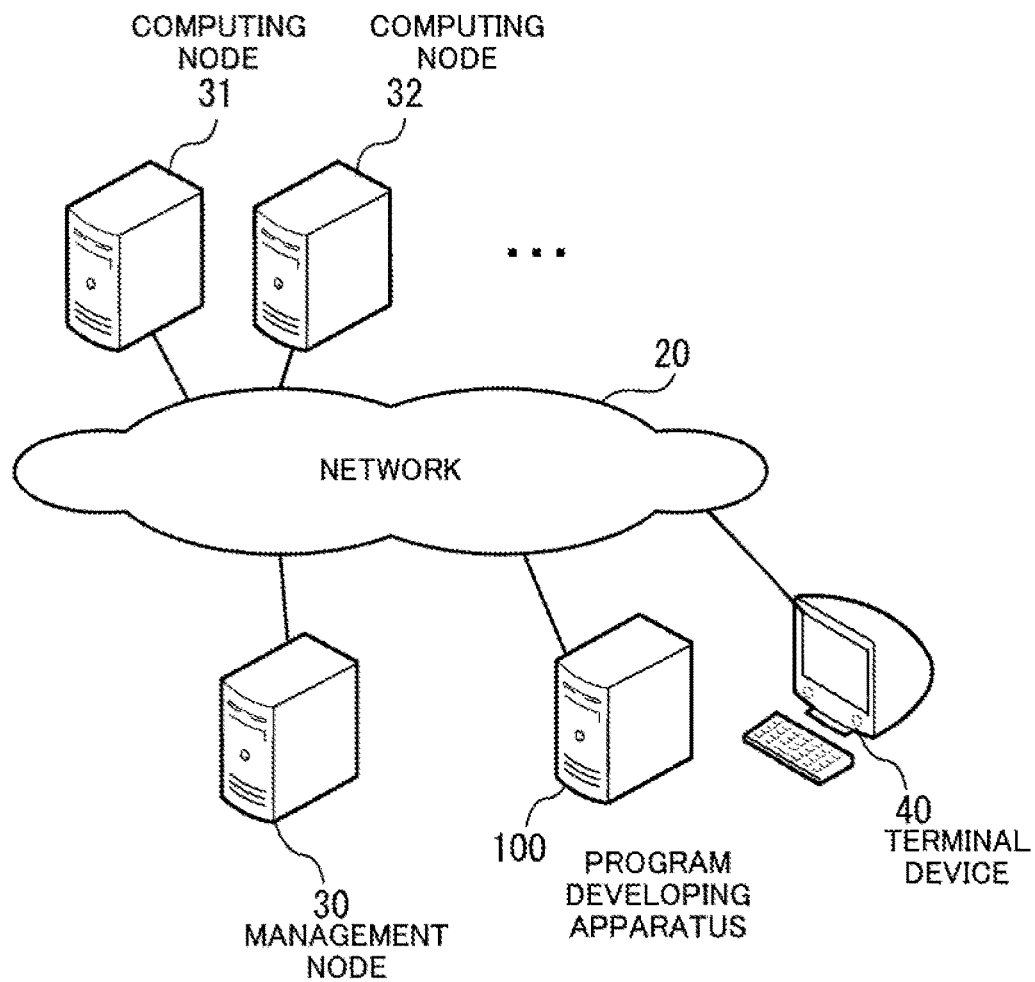
FIG. 2 illustrates an example of a system configuration according to a second embodiment.

FIG. 2 illustrates an example of a system configuration according to the second embodiment. In the system illustrated in FIG. 2, a plurality of computing nodes 31, 32, . . . are connected to a management node 30 over a network 20. The computing nodes 31, 32, . . . execute jobs in response to instructions from the management node 30. The jobs to be executed include a parallel job that is executed in parallel on a plurality of processors or cores. The management node 30 assigns such a parallel job to a plurality of processors or cores provided in the computing nodes 31, 32, . . . , so as to execute the parallel job in parallel using the processors or cores.

The processors provided in the computing nodes 31, 32, . . . have SIMD operation units. The SIMD operation units are circuits for interpreting and processing SIMD instructions. The SIMD operation units are able to interpret SIMD instructions with masks. The masks used are specified using a subscript expression for a mask array. However, the SIMD operation units are able to use only a simple computation expression as the subscript expression for the mask array. For example, for operation processing in computers, a bitwise logical OR circuit or a bitwise logical AND circuit is implemented by using a simple circuit. However, a division circuit is a complicated circuit. Considering that an SIMD operation unit is mounted in a limited space of a processor, it would be hard to additionally mount a division circuit for interpreting the subscript expression for the mask array. Therefore, the processors in the computing nodes 31, 32, . . . are able to use a bitwise logical AND as the subscript expression for the mask array that specifies masks in an SIMD instruction with masks, but are not able to use divisions.

A program developing apparatus 100 and a terminal device 40 are connected to the network 20. The program developing apparatus 100 is a computer for developing a program that describes processes of jobs to be executed by the computing nodes 31, 32, . . . . The terminal device 40 is a computer that is used by a user who develops a program using the program developing apparatus 100. The user uses the terminal device 40 to create a source program in a high-level programming language, and sends the source program to the program developing apparatus 100.

The program developing apparatus 100 includes a compiler. The program developing apparatus 100 uses the compiler to compile the source program received from the terminal device 40, and outputs the resultant execution program in a format executable on the processors of the computing nodes 31, 32, . . . . The program developing apparatus 100 sends the execution program to the management node 30 and instructs the management node 30 to execute the execution program. Thereby, the management node 30 generates jobs to be executed to perform processes based on the execution program, and the jobs are executed by the computing nodes 31, 32, . . . .

Figure 3:
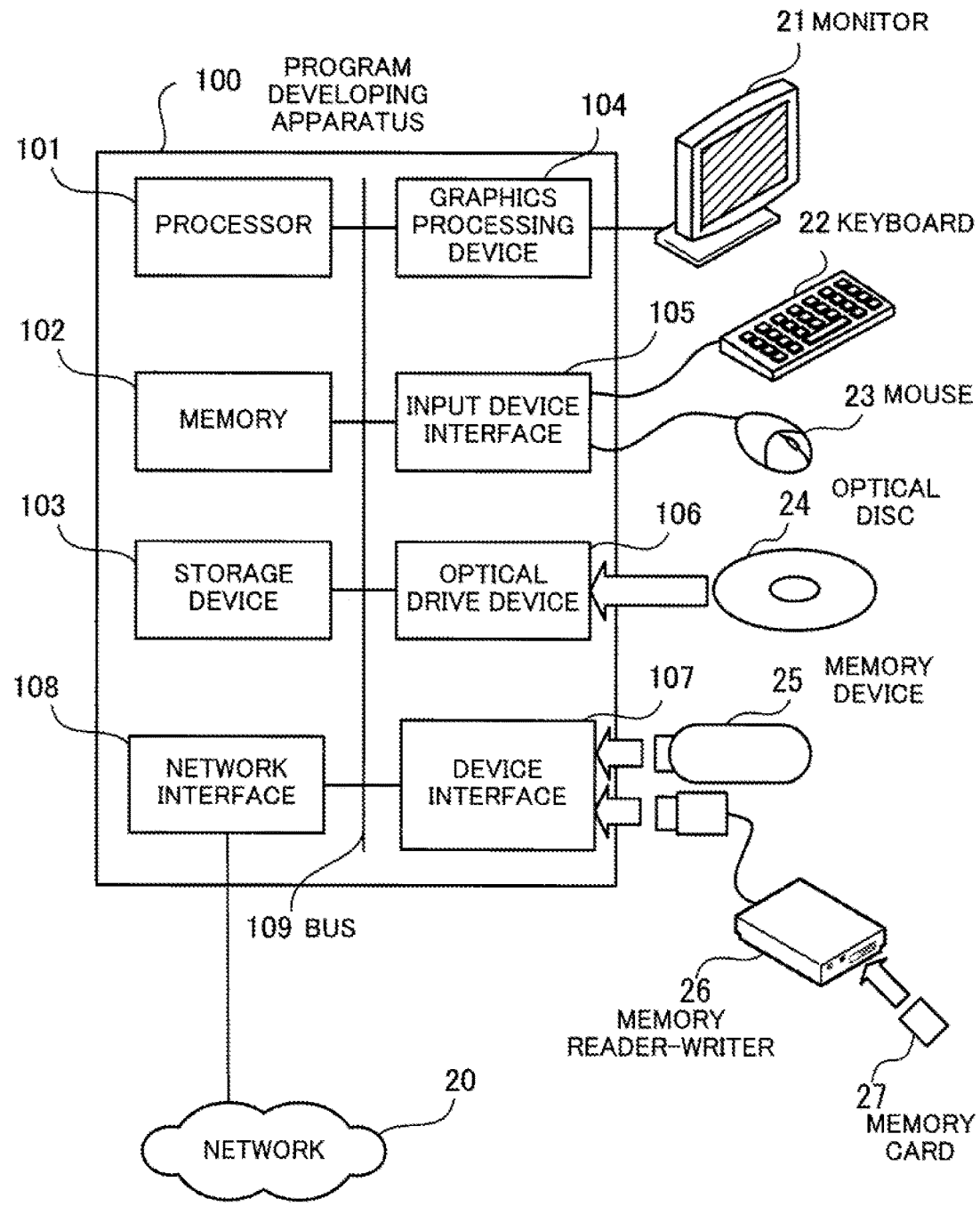
FIG. 3 illustrates an example of a hardware configuration of a program developing apparatus used in the second embodiment.

FIG. 3 illustrates an example of a hardware configuration of the program developing apparatus used in the second embodiment. The program developing apparatus 100 is entirely controlled by a processor 101. A memory 102 and a plurality of peripheral devices are connected to the processor 101 via a bus 109. The processor 101 may be a multiprocessor. The processor 101 may be a CPU, Micro Processing Unit (MPU), or Digital Signal Processor (DSP). At least some of functions to be implemented by the processor 101 executing programs may be implemented by using Application Specific Integrated Circuit (ASIC), Programmable Logic device (PLD), or other electronic circuits.

The memory 102 is used as a main storage device of the program developing apparatus 100. The memory 102 temporarily stores therein at least part of Operating System (OS) programs and application programs to be executed by the processor 101. Also, the memory 102 stores therein a variety of data that is used by the processor 101 in processing. As the memory 102, a volatile semiconductor storage device, such as a Random Access Memory (RAM), may be used, for example.

The peripheral devices connected to the bus 109 include a storage device 103, a graphics processing device 104, an input device interface 105, an optical drive device 106, a device interface 107, and a network interface 108.

The storage device 103 electrically or magnetically reads and writes data on a built-in storage medium. The storage device 103 is used as an auxiliary storage device of the program developing apparatus 100. The storage device 103 stores therein OS programs, application programs, and a variety of data. In this connection, as the storage device 103, a Hard Disk Drive (HDD) or a Solid State Drive (SSD) may be used.

A monitor 21 is connected to the graphics processing device 104. The graphics processing device 104 displays images on the display of the monitor 21 in accordance with instructions from the processor 101. As the monitor 21, a display device using a Cathode Ray Tube (CRT) display or a liquid crystal display device may be used.

A keyboard 22 and a mouse 23 are connected to the input device interface 105. The input device interface 105 outputs signals received from the keyboard 22 and mouse 23 to the processor 101. In this connection, the mouse 23 is one example of pointing devices, and another pointing device may be used. Other pointing devices include touch panels, tablets, touchpads, trackballs, and others.

The optical drive device 106 reads data from an optical disc 24 with laser light or the like. The optical disc 24 is a portable recording medium on which data is recorded such as to be readable with reflection of light. The optical disc 24 may be a Digital Versatile Disc (DVD), DVD-RAM, CD-ROM (Compact Disc Read Only Memory), CD-R (Recordable), CD-RW (ReWritable), or another.

The device interface 107 is a communication interface that allows peripheral devices to be connected to the program developing apparatus 100. For example, a memory device 25 or a memory reader-writer 26 may be connected to the device interface 107. The memory device 25 is a recording medium having a function of communicating with the device interface 107. The memory reader-writer 26 reads or writes data on a memory card 27, which is a card-type recording medium.

The network interface 108 is connected to the network 20. The network interface 108 communicates data with another computer or communication device over the network 20.

With the above hardware configuration, the processing functions of the second embodiment are implemented. In this connection, the apparatus of the first embodiment may be implemented by using the same hardware as the program developing apparatus 100 of FIG. 3.

The program developing apparatus 100 implements the processing functions of the second embodiment by executing a program recorded in a computer-readable recording medium, for example. The program describing the processing content to be executed by the program developing apparatus 100 may be recorded on a variety of recording media. For example, the program to be executed by the program developing apparatus 100 may be stored on the storage device 103. The processor 101 loads at least part of the program from the storage device 103 to the memory 102 and then executes the program. Alternatively, the program to be executed by the program developing apparatus 100 may be recorded on the optical disc 24, memory device 25, memory card 27, or another portable recording medium. The program stored in such a portable recording medium becomes executable after being installed on the storage device 103 under the control of the processor 101, for example. Alternatively, the processor 101 may execute the program directly read from a portable recording medium.

Figure 4:
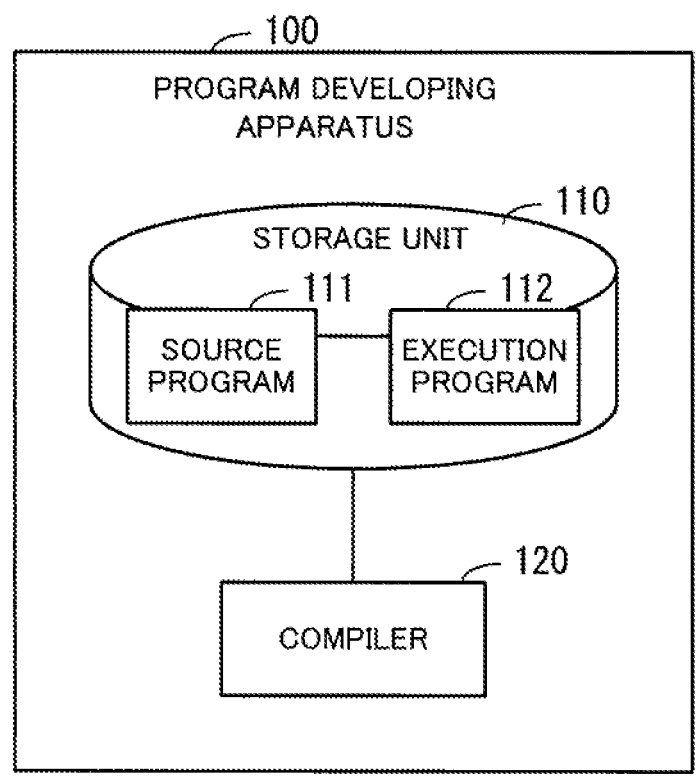
FIG. 4 is a block diagram illustrating functions of the program developing apparatus.

FIG. 4 is a block diagram illustrating functions of the program developing apparatus. The program developing apparatus 100 includes a storage unit 110 and a compiler 120.

The storage unit 110 stores therein a source program 111 and an execution program 112. For example, the storage unit 110 is implemented by using a partial storage space set aside in the memory 102 or storage device 103. In this connection, the storage unit 110 is an example of the storage unit 11 of FIG. 1.

The compiler 120 translates the source program 111, which is written in a high-level programming language, into a machine language to thereby generate the execution program 112 that is directly executable by the processer 101. For example, the compiler 120 is implemented by causing the processor 101 to execute a program module for compiling.

The compiler 120 compiles the source program 111 so as to be executable in parallel, according to the number of cores to be used for executing the execution program 112. In the case where the source program includes a nested loop and the number of iterations of the outermost loop is less than the number of cores, the compiler 120 converts the nested loop into a single loop.

There are cases where, with regard to the nested loop to be converted into a single loop, access to a multidimensional array within the nested loop is not contiguous in the memory. The compiler 120 performs SIMDization such as to generate an SIMD instruction with masks. There is stencil computation as an example in which access is not contiguous in a memory. The stencil computation is to compute, with a nested loop, the value of an element in a multidimensional array using the values of its neighbors in the array.

FIG. 5 illustrates an example of a stencil computation program. A stencil computation program 51 includes a double-nested loop process. To convert the loops of the stencil computation program 51 to a simple single loop that uses a subscript computation based on the contiguousness of a memory, the iteration range of the loop is made to match the statement range of the array and then masks are applied to elements in the array. Thereby, elements to be subjected to computation are separated from elements that are not subjected to the computation.

In this connection, the contiguousness of a memory means that a(30, 1) and a(1, 2) are contiguous in the memory. This contiguousness enables access to a(1, 2) as a(31, 1).

Figure 6:
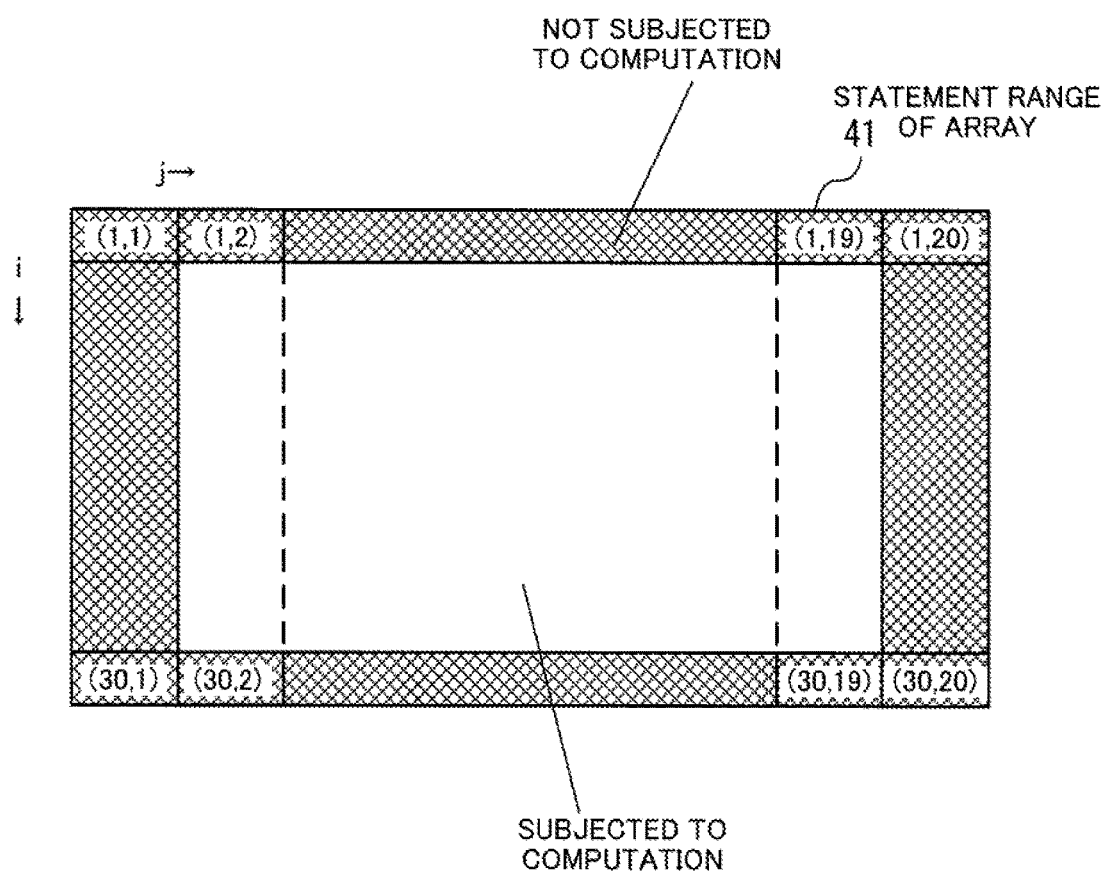
FIG. 6 illustrates an example of a memory space for stencil computation.

FIG. 6 illustrates an example of a memory space for the stencil computation. FIG. 6 illustrates, among the elements in the statement range 41 of an array defined in the stencil computation program 51, elements to be subjected to computation (outlined) and elements not to be subjected to computation (shaded) separately.

When converting the stencil computation program 51 into a program with a single loop, masks are used to prevent elements not to be subjected to the computation, from being subjected to the computation, so that contiguous access is made to the memory. To use the masks, a mask generation process is inserted in the program.

FIG. 7 illustrates an example of a stencil computation program including a mask generation process. A stencil computation program 52 of FIG. 7 includes a description for a mask generation process. In this mask generation process, a mask ("true" or "false") indicating whether a corresponding element is subjected to computation or not is set as a subscript value of a mask array corresponding to the element to be accessed. By performing this mask generation process, as many masks as the number of elements to be subjected to the computation (30×20=600) are generated.

If masks are generated without any measures, the data amount of the masks is very big and this may cause a lack of memory capacity. To deal with this, there is an attempt to reduce the data amount of the masks. For example, elements on both the rightmost and leftmost lines in the memory space illustrated in FIG. 6 are the first and last portions of a loop process, and therefore may be excluded from the loop process.

Figure 8:
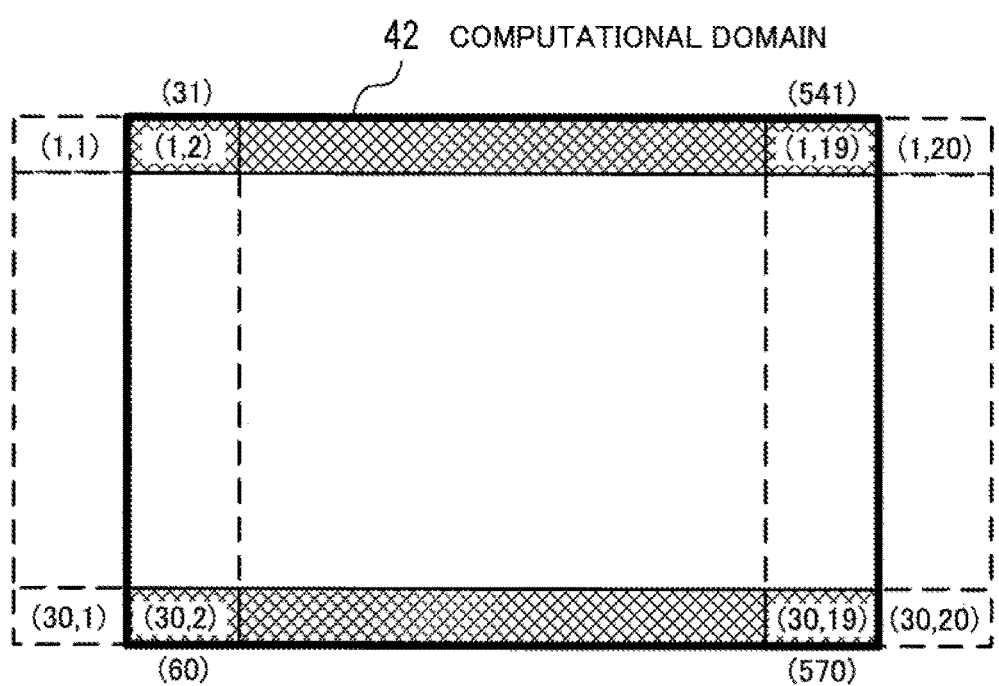
FIG. 8 illustrates an example of an access target range in the memory space for the stencil computation.

FIG. 8 illustrates an example of an access target range in the memory space for the stencil computation. As illustrated in FIG. 8, even if the elements on both the rightmost and leftmost lines are excluded from the iteration range of a loop, it is possible to make contiguous memory access. A computational domain 42 of this case is enclosed with a thick line. As illustrated in FIG. 8, the computational domain 42 includes elements to be subjected to the computation (outlined) and elements not to be subjected to the computation (shaded). Considering that one-dimensional access is made to this computational domain, the iteration range of the loop is from the 31st element to the 570th element.

FIG. 9 illustrates an example of a stencil computation program with a limited iteration range of a loop. In a stencil computation program 53 illustrated in FIG. 9, the iteration range of the loop in the computation is the computational domain 42 of FIG. 8. In this case, masks corresponding to the computational domain 42 may be generated.

Figure 10:
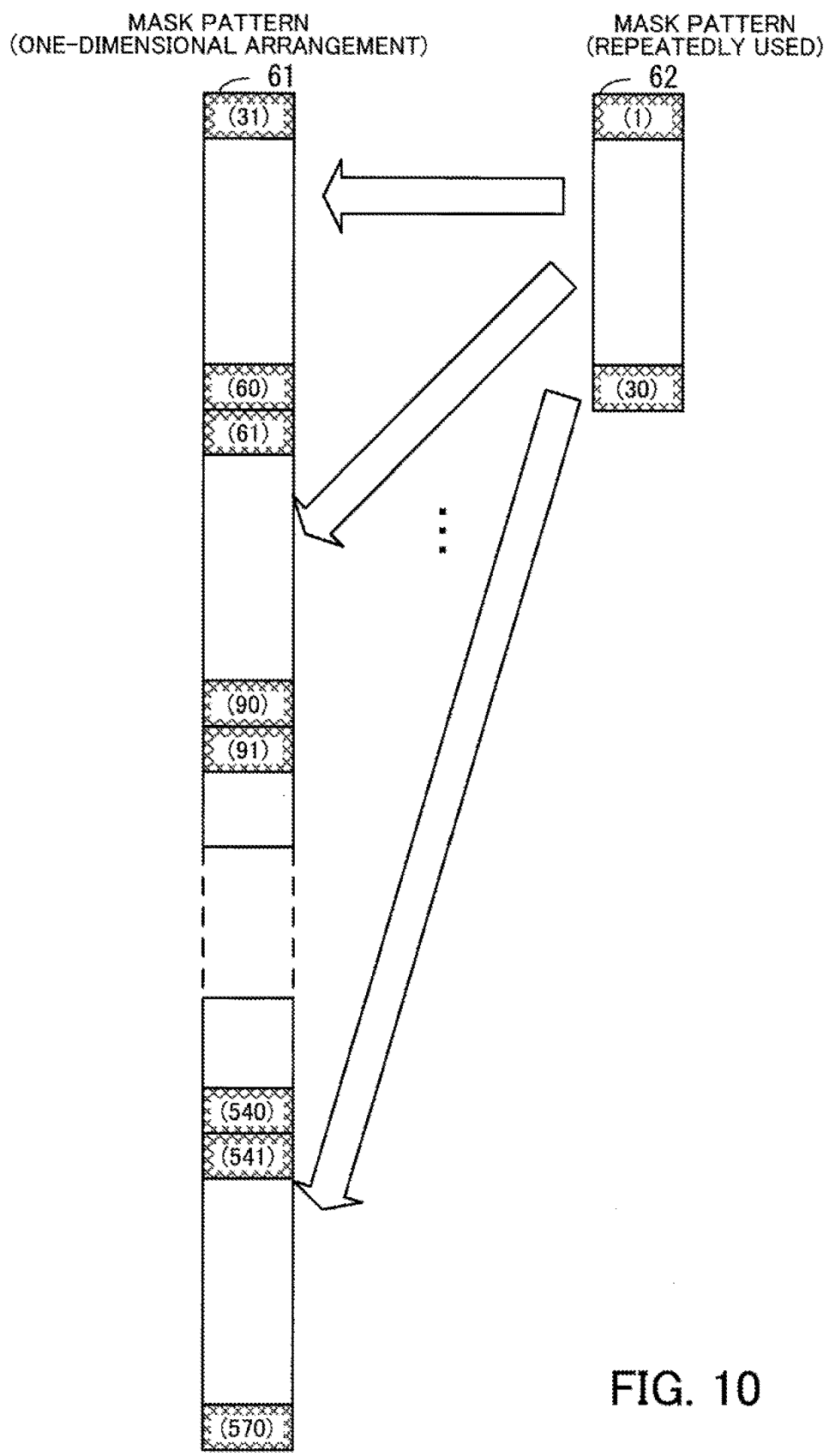
FIG. 10 illustrates an example of a mask array corresponding to the access target range when the iteration range of the loop is limited.

FIG. 10 illustrates an example of a mask array corresponding to the access target range when the iteration range of the loop is limited. By one-dimensionally representing masks corresponding to the computational domain 42 when the iteration range of a loop is limited, a mask pattern 61 illustrated on the left side of FIG. 10 is obtained. In the example of FIG. 10, masks set to "false" are shaded. This mask pattern 61 is a repetition of a mask pattern 62 in which only masks for the first and last elements are set to "false".

The value calculated by subtracting one from the element number of a mask in the mask pattern 61, dividing the subtraction result by 30, and adding one to the remainder of the division corresponds to an element number in the mask pattern 62. For example, with respect to the 61st element of the mask pattern 61, mod((61-1), 30)+1=1 is calculated, and therefore this element corresponds to the first element in the mask pattern 62. In this connection, "mod(x, y)" is an instruction to calculate the remainder of a division of x by y (x and y are integers). That is, it is possible to reduce the data amount of masks by modifying the stencil computation program so as to use the mask pattern 62.

FIG. 11 illustrates an example of a stencil computation program using a mask pattern that is repeatedly used. In a stencil computation program 54 illustrated in FIG. 11, masks corresponding to the mask pattern 62 that is repeatedly used are set. In addition, by using a subscript expression, "mask (mod(ij-1, 30)+1)", elements in the mask array within the loop are specified.

In this way, the data amount of the masks is reduced. For example, with respect to the stencil computation program 52 illustrated in FIG. 7, 600 masks are used. On the other hand, by modifying the program to the stencil computation program 54 of FIG. 11, the number of masks used is reduced to 30.

In the stencil computation program 54, the number of masks used is significantly reduced to 30. However, the subscript expression for the mask array, "mask(mod(ij-1, 30)+1)", includes a division. Therefore, SIMD instructions with masks are not usable in compiling the stencil computation program 54. That is, to reduce the number of masks used, a complicated subscript expression for the mask array may be needed, which ends up being unable to use SIMD instructions with masks.

To deal with this, the compiler 120 of the second embodiment is designed to further modify the stencil computation program 54 in order to reduce the number of masks used, without preventing the use of SIMD instructions with masks. More specifically, the compiler 120 takes the following measures so as not to increase complexity in the subscript expression for the mask array in the stencil computation program 54.

In the stencil computation program 54, the remainder r (r is an integer of one or greater) obtained by dividing the element number n (n is an integer of one or greater) in a mask array by the size a (a is an integer of one or greater) of a mask pattern appears in a subscript of the mask array. The remainder obtained by dividing the integer n by an integer has the following relationship.

The remainder obtained by dividing the integer n by a power of 10, i.e., $10^k$ (k is an integer of one or greater) is the low-order k digits obtained by representing the integer n in decimal number. Similarly, the remainder obtained by dividing the integer n by a power of two, i.e., $2^k$, is the low-order k digits obtained by representing the integer n in binary number. The low-order k digits are low-order k bits obtained by representing the integer n in a bit string.

In addition, the low-order k bits obtained by representing the integer n in binary number may be calculated by a bitwise logical AND of n and $2^k-1$. That is, without using divisions, the remainder obtained by dividing the integer n by a power of two, i.e., $2^k$, may be calculated.

As described above, in the case where the size a of a mask pattern is a power of two, it is possible to calculate the remainder r obtained by dividing the element number n in the mask array by the size a of the mask pattern, using the bitwise logical AND. A simple computation, like a bitwise logical AND, is usable as a subscript expression to specify masks in SIMD instructions with masks. In order to use this feature, if the size a of a mask pattern is not a power of two, the compiler 120 expands the size of the mask pattern to the minimum value among powers of two greater than a.

Figure 12:
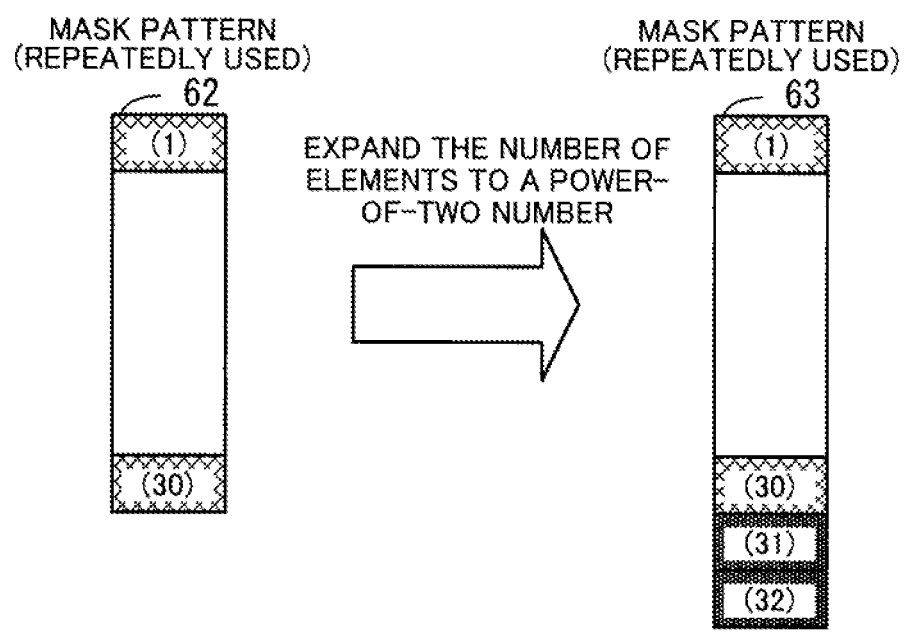
FIG. 12 illustrates an example of expanding the mask pattern.

FIG. 12 illustrates an example of expanding the mask pattern. The number of elements in the mask pattern 62 is "30". "30" is not a power of two, and so the mask pattern is expanded. The minimum number among powers of two greater than "30" is "32 ($2^5$)". Therefore, the mask pattern 62 is expanded to a mask pattern 63 with 32 elements. The 31st and 32nd elements in the expanded mask pattern 63 correspond to a portion not to be subjected to computation. That is to say, the corresponding mask values are set to "false".

Repeated use of the expanded mask pattern 63 reduces the data amount of masks.

Figure 13:
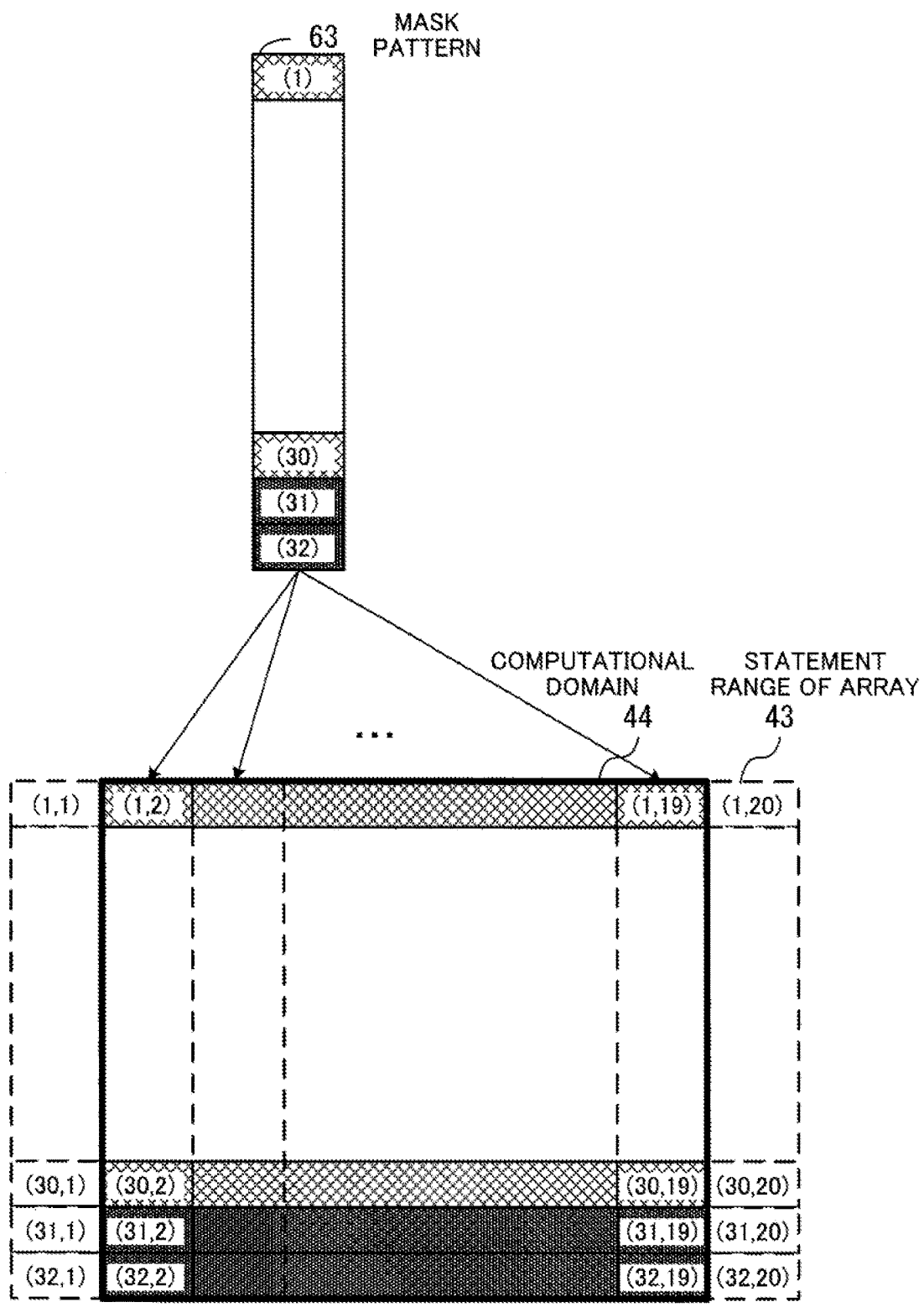
FIG. 13 illustrates a relationship between an expanded mask pattern and an access target range.

FIG. 13 illustrates a relationship between an expanded mask pattern and an access target range. To apply the expanded mask pattern 63, the statement range of the array that is used in the loop process is expanded as well. Then, by repeatedly applying the mask pattern 63 to the computational domain 44 of the expanded statement range 43 of the array, it is possible to set the contiguous elements in the computational domain 44 as access targets in the loop process. In addition, using the mask pattern 63 for a power-of-two number of elements, it is possible to use a bitwise logical AND as a subscript expression for the mask array, so that SIMDization becomes possible.

FIG. 14 illustrates an example of a stencil computation program using the expanded mask pattern. In a stencil computation program 55 of FIG. 14, the statement range of the array is expanded to "aa(32, 20), bb(32, 20)". Then, the values of 32 masks are set, and in the loop process, the masks to be applied are specified by a bitwise logical AND, "mask(iand(ij−1, 31)+1). "iand(x, y)" is a built-in function in Fortran to obtain a logical AND of bits corresponding to integers x and y.

In the stencil computation program 55, the mask pattern 63 has an expanded size that is a power of two, so that the subscript expression for the mask array is simplified. The compiler 120 generates such a stencil computation program 55, thereby making it possible to reduce the number of masks used in the mask array, without preventing the use of SIMD instructions with masks.

The following will describe functions of the compiler 120.

Figure 15:
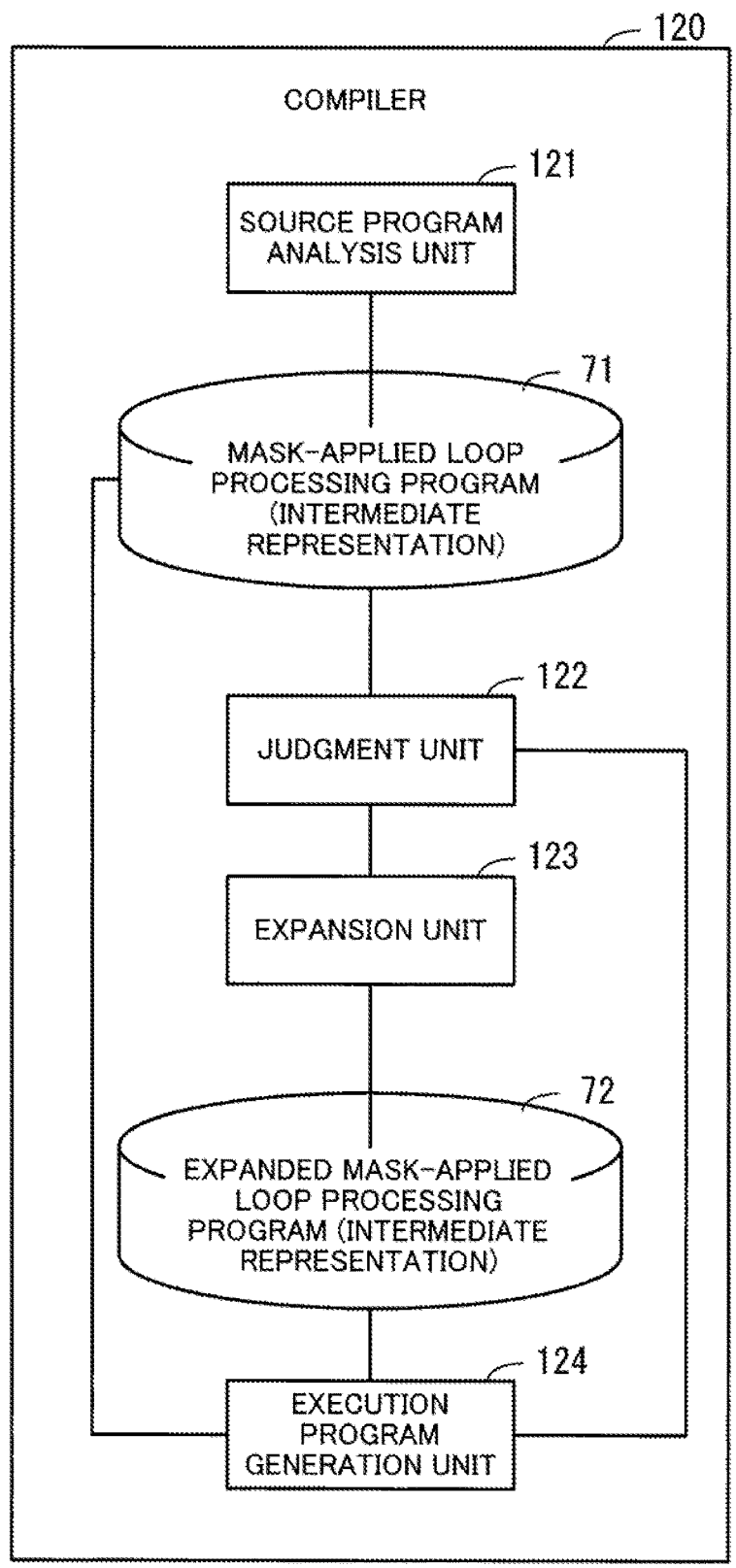
FIG. 15 is a block diagram illustrating functions of a compiler.

FIG. 15 is a block diagram illustrating functions of a compiler. Out of the functions of the compiler 120, FIG. 15 illustrates an optimization function of a program involving a conversion of a nested loop into a single loop and SIMDization.

The compiler 120 includes a source program analysis unit 121, a judgment unit 122, an expansion unit 123, and an execution program generation unit 124. The source program analysis unit 121 analyzes a source program. If the source program includes a nested loop, the source program analysis unit 121 converts the nested loop into a single loop using masks, to thereby generate an intermediate representation program (mask-applied loop processing program 71). The generated mask-applied loop processing program 71 is temporarily stored in the storage unit 110.

The judgment unit 122 determines whether to expand a memory space for storing elements and a mask pattern. For example, the judgment unit 122 determines to expand the memory space for storing elements and the mask pattern if the expansion is effective to improve the processing efficiency. More specifically, the judgment unit 122 compares the amount of memory increased by expanding the memory space with the amount of memory reduced by reducing the data amount of the mask array. If the amount of memory reduced by reducing the data amount of the mask array is greater than the amount of memory increased by expanding the memory space, the judgment unit 122 determines to expand the memory space and mask pattern.

When it is determined to expand the memory space for storing elements and the mask pattern, the expansion unit 123 generates an intermediate representation program (expanded mask-applied loop processing program 72) on the basis of the expanded mask pattern. The generated expanded mask-applied loop processing program 72 is temporarily stored in the storage unit 110. In this connection, the expansion unit 123 is an example of a function covering the array setting unit 12, mask array setting unit 13, and instruction string setting unit 14 of FIG. 1.

The execution program generation unit 124 generates a machine-language execution program on the basis of the mask-applied loop processing program 71 or expanded mask-applied loop processing program 72. For example, when it is determined to expand the memory space for storing elements and the mask pattern, the execution program generation unit 124 generates a machine-language execution program on the basis of the expanded mask-applied loop processing program 72. If it is determined not to expand the memory space for storing elements or the mask pattern, the execution program generation unit 124 generates a machine-language execution program on the basis of the mask-applied loop processing program 71.

With the compiler 120 described as above, the mask-applied loop processing program 71, which is an intermediate representation, is first generated from the source program including the nested loop.

FIG. 16 illustrates an example of generating the mask-applied loop processing program. A source program 73 of FIG. 16 is obtained by generalizing the stencil computation program 51 of FIG. 5. The source program analysis unit 121 analyzes the source program 73 to generate the mask-applied loop processing program 71. The mask-applied loop processing program 71 represents the same processes as the source program 73.

The judgment unit 122 determines based on the mask-applied loop processing program 71 whether to expand the memory space for storing elements and the mask pattern.

Figure 17:
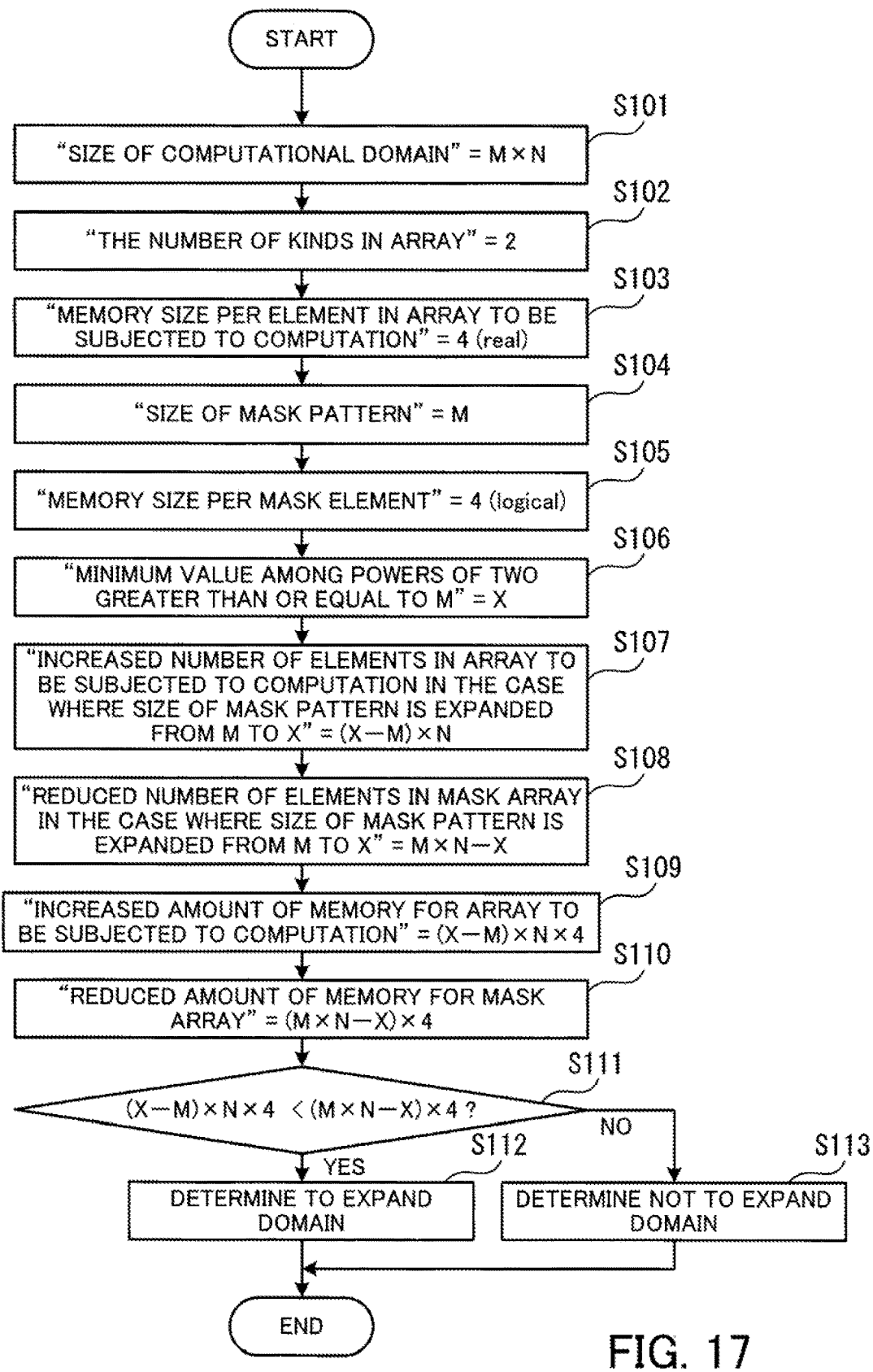
FIG. 17 is a flowchart illustrating a procedure for a judgment process.

FIG. 17 is a flowchart illustrating a procedure for a judgment process. The process of FIG. 17 will be described step by step.

(Step S101) The judgment unit 122 obtains the value "M×N" (M and N are integers of one or greater) indicating the size of a computational domain (the number of elements in each dimensional direction).

(Step S102) The judgment unit 122 obtains the value "2" indicating the number of kinds in the array.

(Step S103) The judgment unit 122 obtains the value "4" indicating the memory size per element in the array to be subjected to the computation.

(Step S104) The judgment unit 122 obtains a value "M" indicating the size (the number of elements) of the mask pattern.

(Step S105) The judgment unit 122 obtains the value "4" indicating the memory size per mask element.

(Step S106) The judgment unit 122 obtains the minimum value "X" (X is an integer of one or greater) among powers of two greater than or equal to "M".

(Step S107) The judgment unit 122 calculates how many elements are increased in the array to be subjected to the computation in the case where the size of the mask pattern is expanded from "M" to "X", using an expression "(X−M)×N".

(Step S108) The judgment unit 122 calculates how many elements are reduced in the mask array in the case where the size of the mask pattern is expanded from "M" to "X", using an expression "M×N−X".

(Step S109) The judgment unit 122 calculates how much memory is increased for the array to be subjected to the computation, using an expression "(X−M)×N×4".

(Step S110) The judgment unit 122 calculates how much memory is reduced for the mask array, using an expression "(M×N−X)×4".

(Step S111) The judgment unit 122 determines whether the increased amount of memory for the array to be subjected to the computation is less than the reduced amount of memory for the mask array, i.e., whether "(X−M)×N×4"<" (M×N−X)×4". If the increased amount of memory for the array to be subjected to the computation is less, the process proceeds to step S112. Otherwise, the process proceeds to step S113.

(Step S112) The judgment unit 122 determines to expand the domain, and then this judgment process ends.

(Step S113) The judgment unit 122 determines not to expand the domain, and then this judgment process ends.

As described above, the judgment unit 122 determines whether to expand the computational domain and the mask pattern. The determination is made based on a comparison between the increased amount of memory by the domain expansion and the reduced amount of memory by the reduction in the data amount of the mask array. If the latter exceeds the former, the judgment unit 122 determines to expand the domain.

When it is determined to expand the domain, the expansion unit 123 expands the memory space for storing elements and the mask pattern in the mask-applied loop processing program 71, thereby generating the expanded mask-applied loop processing program 72.

Figure 18:
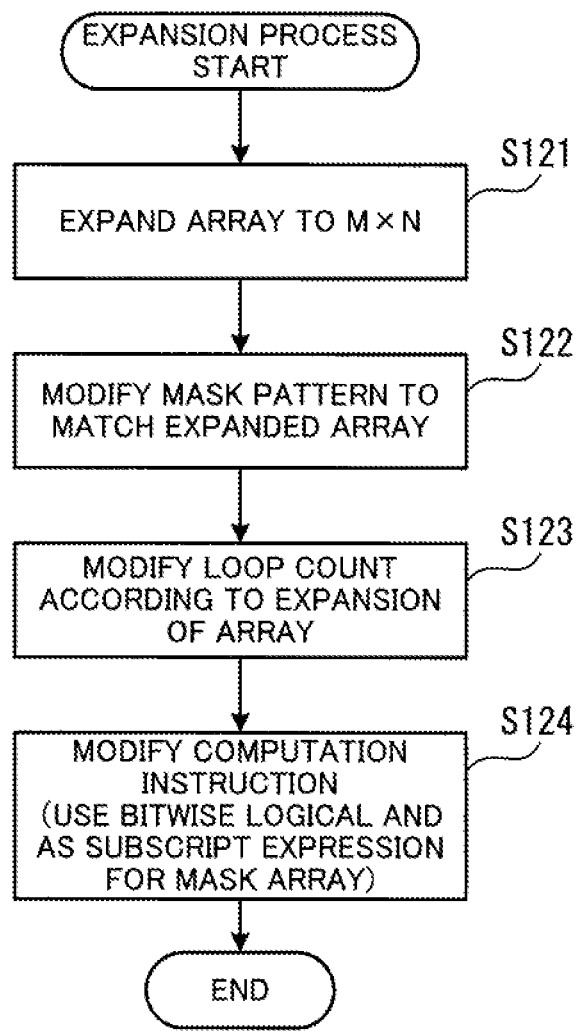
FIG. 18 is a flowchart illustrating an example of a procedure for an expansion process.

FIG. 18 is a flowchart illustrating an example of a procedure for an expansion process. The process of FIG. 18 will be described step by step.

(Step S121) The expansion unit 123 modifies the description of the mask-applied loop processing program 71 so that the statement range of the array is expanded to "MxN", and adds the modified description to the expanded mask-applied loop processing program 72.

(Step S122) The expansion unit 123 modifies the description of the mask-applied loop processing program 71 so that the mask pattern is expanded to an expanded mask pattern, and adds the modified description to the expanded mask-applied loop processing program 72. The number of elements in the mask pattern after the modification is "X".

(Step S123) The expansion unit 123 modifies the description of the loop count in the mask-applied loop processing program 71 according to the expansion of the array, and adds the modified description to the expanded mask-applied loop processing program 72.

(Step S124) The expansion unit 123 modifies the computation instruction in the loop process of the mask-applied loop processing program 71, and adds the modified computation instruction to the expanded mask-applied loop processing program 72. In the modified computation instruction, a subscript expression for the mask array is represented as a bitwise logical AND, so that masks to be applied to respective elements are specified.

With the expansion process as described above, the mask-applied loop processing program 71 is modified to the expanded mask-applied loop processing program 72.

FIG. 19 illustrates an example of the expansion process. The description "real:array:a(M,N), b(M,N)" in the mask-applied loop processing program 71 is modified to "real:array:a(X,N),b(X,N)" in the expanded mask-applied loop processing program 72. Thereby, the computational domain is expanded.

The description "logical:mask(M,N)" in the mask-applied loop processing program 71 is modified to "logical:mask(X)" in the expanded mask-applied loop processing program 72. As a result, the mask array is expanded to include a power-of-two number (X) of masks.

The description for setting the values of masks in the mask-applied loop processing program 71 is changed to "mask=false", "loop:i:start value=2:end value=M−1", and "mask(i)=true" in the expanded mask-applied loop processing program 72. As a result, the value of each mask in the repeatedly used mask pattern is set. The values of masks added in the expansion are "false".

The description "loop:ij:start value=1+M:end value=Mx N−M" in the mask-applied loop processing program 71 is changed to "loop:ij:start value=1+X:end value=X×N−X" in the expanded mask-applied loop processing program 72. As a result, the loop count is changed to match the expansion of the array.

In the mask-applied loop processing program 71, a computation instruction is described as "if:mask(ij,1)==true:a(ij, 1)=(b(ij−1−M,1)+b(ij+1−M, 1)+b(ij−1+M, 1)+b(ij+1+M, 1))/4". This computation instruction is changed to "if:mask (iand(ij−1,X−1)+1)==true:a(ij,1)=b(ij−1−X,1)+b(ij+1−X, 1)+b(ij−1+X,1)+b(ij+1+X,1))/4" in the expanded mask-applied loop processing program 72. In this computation instruction, "mask(iand(ij−1,X−1)+1)" specifies masks in the mask array, and "iand(ij−1,X−1)+1" is a subscript expression for the mask array.

The subscript expression represents a computation of performing the bitwise logical AND of the value obtained by subtracting one from an element number "ij" and the value obtained by subtracting one from X, and adding one to the result of the bitwise logical AND. When "X" is "32", the value obtained by subtracting one from "X" is "31". When "31" ($2^5-1$) is represented in binary number ("0/1" for each bit), "11111" (a bit string of five "1") is obtained. That is, the low-order five bits of the value obtained by subtracting one from the element number "ij" is obtained using the logical AND of the value obtained by subtracting one from the element number "ij" and the value obtained by subtracting one from X. These five bit values are the remainder obtained by dividing the value obtained by subtracting one from the element number (ij) by "32". The remainder obtained by the division by "32" is any value in a range from "0" to "31". By adding "one" to the remainder, a number indicating any of the masks "1" to "32" in the mask pattern 63 of FIG. 12 is obtained.

As described above, in the second embodiment, expanding the size of the computational domain to be equal to a power of two leads to simplifying the subscript expression for the mask array. This makes it possible to achieve both a reduction in the number of masks used in the mask array and the use of SIMD instructions with masks.

In addition, the expansion process is performed only when the use efficiency of memory is improved. This makes it possible to avoid a decrease in the use efficiency of memory due to the expansion process.

Other Embodiments

The second embodiment makes it possible to achieve both a reduction in the number of masks used in a mask array and the use of SIMD instructions with masks, by modifying an intermediate representation program. It is also possible to modify a source program for the achievements.

FIG. 20 illustrates an example of modifying a source program. As illustrated in FIG. 20, it is possible to modify a source program 73 to a source program 74 in which a subscript expression for a mask array is represented using a bitwise logical OR. By compiling the source program 74, it is possible to generate an execution program that achieves both a reduction in the number of masks used in the mask array and the use of SIMD instructions with masks.

Heretofore, the embodiments have been exemplified. In this connection, the components described in the embodiments may be replaced with other components having equivalent functions or other components or processing operations may be added. In addition, desired two or more configurations (features) in the embodiments may be combined.

According to one aspect, it is possible to reduce the number of masks used in an SIMD instruction with masks.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory configured to store a first program including a first instruction string, the first instruction string providing an instruction for computation of elements to be subjected to the computation among a plurality of elements in a first array using a first mask array, the first mask array specifying a plurality of masks each indicating whether a corresponding one of the plurality of elements is subjected to the computation or not; and
a processor configured to perform a process including
when an occurrence pattern indicating whether each of the plurality of elements is subjected to the computation or not, indicated by the first mask array, is a repetition of a first pattern for every determined number of elements, setting a second array in a second program, the second array being generated by adding one or more elements to the first array so that the occurrence pattern becomes a repetition of a second pattern for every power-of-two number of elements greater than or equal to the determined number of elements,
setting a second mask array in the second program, the second mask array being generated by adding, to the first mask array, one or more masks each indicating that a corresponding element is not subjected to the computation so that the second mask array includes as many masks as a number of elements included in the second pattern, and
setting a second instruction string in the second program, the second instruction string providing instructions for specifying, in the second mask array, each mask to be applied to one of a plurality of elements in the second array by using a bitwise logical AND using a value indicating a position of the one of the plurality of elements in the second array and for the computation of elements corresponding to masks indicating that corresponding elements are subjected to the computation among the plurality of elements in the second array.

2. The information processing apparatus according to claim 1, wherein, when the first array is a multidimensional array including the determined number of elements in one dimension, the setting of the second array includes increasing a number of elements included in the one dimension of the first array to the number of elements included in the second pattern, and setting a multidimensional array with the number of elements increased, as the second array.

3. The information processing apparatus according to claim 1, wherein the setting of the second mask array includes taking, as a subscript of the second mask array, a value calculated by performing the bitwise logical AND of a value obtained by subtracting one from a value indicating a position of an element to be subjected to the computation and a value obtained by subtracting one from the number of elements included in the second pattern and then adding one to a result of the bitwise logical AND, in the second instruction string.

4. The information processing apparatus according to claim 1, wherein the setting of the second array includes taking a minimum value among powers of two greater than or equal to a number of elements included in the first pattern, as the number of elements included in the second pattern.

5. The information processing apparatus according to claim 1, wherein the process further includes
comparing a first differential value with a second differential value to determine whether to generate the second program, the first differential value indicating a difference between a data amount of the first mask array and a data amount of the second mask array, the second differential value indicating a difference between a data amount of the first array and a data amount of the second array; and
performing the setting of the second array, the setting of the second mask array, and the setting of the second instruction string when it is determined to generate the second program.

6. A non-transitory computer-readable recording medium storing a computer program that causes a computer to perform a process including:
based on a first program including a first instruction string, the first instruction string providing an instruction for computation of elements to be subjected to the computation among a plurality of elements in a first array using a first mask array, the first mask array specifying a plurality of masks each indicating whether a corresponding one of the plurality of elements is subjected to the computation or not,
setting, when an occurrence pattern indicating whether each of the plurality of elements is subjected to the computation or not, indicated by the first mask array, is a repetition of a first pattern for every determined number of elements, a second array in a second program, the second array being generated by adding one or more elements to the first array so that the occurrence pattern becomes a repetition of a second pattern for every power-of-two number of elements greater than or equal to the determined number of elements;
setting a second mask array in the second program, the second mask array being generated by adding, to the first mask array, one or more masks each indicating that a corresponding element is not subjected to the computation so that the second mask array includes as many masks as a number of elements included in the second pattern; and
setting a second instruction string in the second program, the second instruction string providing instructions for specifying, in the second mask array, each mask to be applied to one of a plurality of elements in the second array by using a bitwise logical AND using a value indicating a position of the one of the plurality of elements in the second array and for the computation of elements corresponding to masks indicating that corresponding elements are subjected to the computation among the plurality of elements in the second array.

7. A conversion method comprising:
based on a first program including a first instruction string, the first instruction string providing an instruction for computation of elements to be subjected to the computation among a plurality of elements in a first array using a first mask array, the first mask array specifying a plurality of masks each indicating whether a corresponding one of the plurality of elements is subjected to the computation or not,
setting, by a processor, when an occurrence pattern indicating whether each of the plurality of elements is subjected to the computation or not, indicated by the first mask array, is a repetition of a first pattern for every determined number of elements, a second array in a second program, the second array being generated by adding one or more elements to the first array so that the occurrence pattern becomes a repetition of a second pattern for every power-of-two number of elements greater than or equal to the determined number of elements;

setting, by the processor, a second mask array in the second program, the second mask array being generated by adding, to the first mask array, one or more masks each indicating that a corresponding element is not subjected to the computation so that the second mask array includes as many masks as a number of elements included in the second pattern; and setting, by the processor, a second instruction string in the second program, the second instruction string providing instructions for specifying, in the second mask array, each mask to be applied to one of a plurality of elements in the second array by using a bitwise logical AND using a value indicating a position of the one of the plurality of elements in the second array and for the computation of elements corresponding to masks indicating that corresponding elements are subjected to the computation among the plurality of elements in the second array.

* * * * *